3,093,602
WATER-IN-OIL EMULSION TEXTILE DECO-
RATING COMPOSITIONS
Arthur Booth, Little Falls, N.J., Roy A. Pizzarello, Mount
Vernon, N.Y., and John E. De Graff, Waldwick, N.J.,
assignors to Interchemical Corporation, New York,
N.Y., a corporation of Ohio
No Drawing. Filed Aug. 5, 1958, Ser. No. 753,186
8 Claims. (Cl. 260—17)

This invention relates to the art of textile printing and is directed particularly to new textile printing pastes of the pigmented water-in-oil emulsion type.

The art of printing of textile with pigmented water-in-oil emulsions has grown rapidly since its beginning (U.S. Patents Nos. 2,222,581-2) and such growth has been promoted no doubt by important technical improvements, e.g. U.S. Patents No. 2,364,692 and No. 2,691,005. Although pigmented water-in-oil emulsions have achieved remarkable commercial success they still have certain disadvantages. One of these disadvantages has been that it requires high temperatures to cure the prints when good wash and scrub fastness are desired. Conditions ranging up to 350° F. for three minutes are required in certain instances to obtain the desired fastness properties, e.g. on nylon. Also many textile printing plants are not equipped to heat cure the thermosetting resins used as the binder in pigmented water-in-oil emulsion print pastes. In order for these plants to use pigments for printing on textiles, it has been the desire to find a resin binder for the pigment that could be cured under the relatively mild conditions available in these plants. Textile printers that use dyestuffs invariably have steam agers and acid agers. It has, therefore been a disadvantage of the pigmented emulsion textile printing system that it could not be carried out using such conventional steam ageing and acid ageing equipment to obtain good wash and scrubfastness.

Another disadvantage of the pigmented water-in-oil emulsion textile printing system has been its failure to give good discharge prints when combined with a "discharge agent." By "discharge printing" is ment the printing of a previously dyed cloth with a printing composition containing a discharge agent which will destroy, or discharge, the color in the printed areas. This discharge agent may be a reducing agent or an oxidizing agent depending upon the dischargeable dye used to previously dye the fabric. Azo dyes are commonly used as the dischargeable dye and these azo dyes necessitate the use of a reducing agent as the discharge agent. Frequently it is desired to print with a composition containing a discharge agent and a coloring material that is not destroyed by the discharge agent. This non-dischargeable color will, of course, be of different color than the background color on the previously dyed fabric. By such techniques intricately multicolored designs on contrasting backgrounds are obtainable. Although many pigments are stable to discharge agents it has never been possible to obtain discharge prints that are completely free from defects by including a discharge agent in a pigmented water-in-oil emulsion print paste. Such a print paste usually produces a print having a mottled appearance.

The print pastes of the present invention alleviate to a large degree the above enumerated disadvantages of the prior art pigmented water-in-oil textile printing pastes.

In accordance with the present invention pigmented water-in-oil-type print pastes contain, as essential ingredients, a water-immiscible, volatile organic solvent such as would conventionally be used in emulsion print pastes, a pigment, an alkyd resin or ethyl cellulose, such as would conventionally be used as an emulsifying agent, and as a binder system a substantially linear, high polymeric material containing reactive hydrogens, especially carboxylic acid hydrogens or amide hydrogens, and a trifunctional monomeric cross-linking agent selected from the group consisting of trialkylene-1,2-phosphoramides having the following structure—

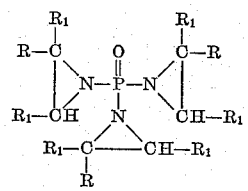

where R is an alkyl group containing 1 to 2 carbons and $R_1$ is hydrogen or an alkyl group containing 1 to 2 carbons.

Advantageously, the print pastes of the present invention may contain additional ingredients, such as low crock agents, water thickeners, emulsion stabilizers, and discharge agents.

The polymeric material containing reactive hydrogen preferably is an acrylic polymer or copolymer, including polyacrylic acid or polymethacrylic acid, copolymers of these acids, especially copolymers with acrylic or methacrylic acid esters, acrylonitrile or methacrylonitrile. Copolymers from three or more different monomers may advantageously contain a minor amount of one or more of the non-acrylic type monomers such as styrene, butadiene, vinyl butyl ether, etc. The other general group of acrylic polymeric material containing reactive hydrogens is the polyacrylamide group including the polymers of acrylamide and methacrylamide. Again, when these polymers are produced by copolymerizing acrylamide or methacrylamide with other copolymerizable monomers it is essential that at least one other acrylic monomer, such as esters of acrylic acid or methacrylic acid, and acrylonitrile or methacrylonitrile, be employed, but a minor amount of other copolymerizable material can be included similarly to the copolymers of acrylic and methacrylic acid.

The reactive hydrogen containing polymers may be used as aqueous solutions or as dispersions in water (e.g. latex) when the polymer is insoluble in water. The insoluble polymers, when employed as the cross-linking polymer, have the additional advantage of imparting some degree of crockfastness to the resulting pigmented fabric that is not obtained by use of water-soluble polymers as the cross-linkable binder component. In this manner the use of a polymer serving two functions obviously decreases the complexity of the system.

Trifunctional monomeric cross-linking agents that are operable in the present invention are prepared by reacting the desired 1,2-alkylene imine with phosphorous oxychloride in accordance with known prior art methods, e.g. German Patent No. 863,055, or U.S. Patent No. 2,606,902. For example 1,2-propylene-imine can be reacted with phosphorus oxychloride to produce tripropylene-1,2-phosphoramide. In general, the cross-linking agents that are operable in the invention are produced by reacting phosphorous oxychloride in the presence of acid binding agents with an alkylene imine having the structure—

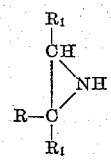

where R is an alkyl group containing 1 to 2 carbons and $R_1$ is hydrogen or alkyl group containing 1 to 2 carbon atoms.

It is appreciated that certain alkylene imine derivatives have been used with cross-linkable polymers as binders for attaching pigments to textiles. The nearest approach that the prior art has come to the present invention is the use of ethylene imine derivatives, rather than derivatives of the higher homologs of ethylene imine, in aqueous print pastes and in oil-in-water emulsions, wherein the ethylene imine derivative is dissolved in water.

The phosphoramide derivatives of the higher homologs of ethylene imine, such as employed in the present invention, are a great deal more stable in water-in-oil emulsions than the simplest member of the series, i.e. tripropylene phosphoramide is much more stable than triethylene phosphoramide. This surprisingly greater stability is especially noticeable in the concentrate color dispersions and makes possible the storing of concentrate color dispersions containing the cross-linker for periods up to three months without appreciable deterioration or gelling caused by the cross-linker. Similar compositions containing triethylene phosphoramide as the cross-linker are stable only for a few days before they gell.

Printing pastes of the present invention show much less tarnishing and better color value than prior art printing pastes containing imine derivatives as cross-linkers. Tarnishing is a phenomenon observed during printing wherein appreciable amounts of print paste are applied to portions of the textile cloth where no deposit of color is intended. Its immediate cause is that the doctor blade does not remove all of the print paste from the non-engraved, or non-printing areas, of the intaglio printing cylinder.

The following examples in which the parts are by weight will further illustrate the invention.

EXAMPLE 1

A red concentrate color is prepared by flushing a pigment pulp containing 20% azo red ITR and 80% water into a water immiscible organic phase comprising a solution of alkyd resin and ethyl cellulose in water immiscible solvent and then adding tripropylene phosphoramide. The parts by weight to give a 15% pigment concentrate are:

| | |
|---|---|
| 20% ITR Red pulp (the pigment is made by coupling the 2,5-dimethoxy-5-chloranilide of β-oxynaphthoic acid with 2-methoxy-5-sulfondiethyl aniline) _____ dry pig. | 15.0 |
| Ethyl cellulose solution (1.2 parts 50 cp. grade T-type ethyl cellulose, 1.8 parts octyl alcohol and 9 parts turpentine) _____ | 12.0 |
| Alkyd resin solution (50% xylol) _____ | 3.6 |
| Turpentine _____ | 63.4 |
| Tripropylene-1,2-phosphoramide _____ | 6.0 |

Preferably, the first three ingredients are mixed with enough turpentine to give 30–35% oil phase and then the pigment is flushed into the oil phase by working in a dough mixer and removing the water. Finally, when the water content is below 1% water—(determined by azeotropic distillation of a sample with xylol) the flushed color is mixed with the remainder of the turpentine and with the tripropylene-1,2-phosphoramide to give a red color concentrate containing 15% pigment on a dry pigment basis. This concentrate was substantially unchanged after storage at 130° F. The alkyd resin used in the concentrate color is made from 10.8 parts of a polymeric polyhydric alcohol having alternating aliphatic chains and aromatic nuclei united through ether oxygen and containing approximately 7 hydroxyl groups per mole and having a molecular weight on the order of 900 (e.g. Epon 1001), 10.8 parts of a phenoxyethanol-formaldehyde condensate of melting point 76° C., 14.3 parts soya fatty acids and 2.86 parts of phthalic anhydride.

An extender paste for use with the above concentrate is prepared by emulsifying 70 parts of water into 30 parts alkyd resin solution consisting of

| | |
|---|---|
| Alkyd resin (same as in the concentrate color) __ | 1.00 |
| Pine oil _____ | 0.25 |
| Xylol _____ | 0.75 |
| Varsol #2 (petroleum hydrocarbon solvent, boiling range 306–394° F., Kauri butanol value 33–45) _____ | 28.0 |

A print paste is prepared by mixing the extender paste, color concentrate and cross-linking polymer in the ratio required to print the desired depth of shade. The cross-linkable polymer can be included in the clear extender paste but it is preferably kept at a minimum because the amount of cross-linkable polymer required will vary immensely with the "length of cut," or amount of extender used. In other words the amount of cross-linkable polymer required will vary directly with the depth of shade printed, or with the amount of color in the print paste. A preferred print paste for printing at 4% pigment concentration would consist of:

| | |
|---|---|
| Concentrate color _____ | 26.65 |
| Water-in-oil emulsion extender paste _____ | 58.35 |
| 40% latex of cross-linkable copolymer of 65 parts butadiene and 35 parts of acrylonitrile modified with 3–5% methacrylic acid _____ | 15.00 |

This paste prints a deep shade of red when printed on 80 square cotton. Curing at 100° C. for about two minutes gives a print having excellent fastness properties. Similarly, steam ageing for eight minutes or acid-steam ageing for 5 to 8 minutes gives a red print having excellent fastness properties. The printing paste gave no evidence of tarnishing during the printing of the textile fabric.

EXAMPLE 2

A storage stable concentrate color containing imine cross-linker is prepared by flushing a pigment pulp containing 20% phthalocyanine blue pigment and 80% water into a water immiscible organic phase comprising a solution of alkyd resin and ethyl cellulose in water immiscible solvent and then adding tri-propylene phosphoramide. The parts by weight to give a 15% pigment concentrate are:

| | Percent by weight |
|---|---|
| 20% phthalocyanine pigment pulp __(dry pig.)__ | 15.00 |
| Ethyl cellulose solution (same as in Example 1) __ | 12.00 |
| Alkyd resin solution (same as in Example 1) ____ | 3.60 |
| Turpentine _____ | 63.40 |
| Tripropylene-1,2-phosphoramide _____ | 6.00 |

To make a water-in-oil emulsion print paste containing 2% color this concentrate is cut with appropriate amounts of extender as follows:

| | |
|---|---|
| Concentrate color _____ | 13.33 |
| 40% latex of copolymer of 45 parts acrylonitrile and 55 parts of butadiene modified with 1 to 5% of copolymerized methacrylic acid _____ | 10.00 |
| Clear water-in-oil emulsion _____ | 76.67 |

In this print paste the 76.67 parts of clear emulsion contained:

| | |
|---|---|
| Ethyl cellulose, 50 cp. grade, T-type _____ | .53 |
| Octyl alcohol _____ | 1.03 |
| Ethyl cellulose, 10 cp. grade, T-type _____ | .50 |
| Solvesso 100 (highly aromatic solvent naphtha having a boiling range of 310 to 365° F.) _____ | .70 |
| 22% solution of polyacrylic acid in water _____ | 2.08 |
| Ammonium hydroxide (25%) _____ | .55 |
| Di-ammonium phosphate _____ | .09 |
| Turpentine _____ | 1.04 |
| Varsol No. 2 _____ | 18.90 |
| Tripropylene-1,2-phosphoramide _____ | .80 |
| Water _____ | 50.45 |

The print paste gives a strong blue color when printed on cotton fabrics from an intaglio cylinder. The prints, after conventional curing have good crock resistance and washfastness.

EXAMPLE 3

A yellow color concentrate containing 15.5% of benzidine yellow pigment (tetrazotized 3,3' dichlorobenzidine coupled to aceto-acet-2,4-dimethoxyaniline) is prepared by flushing the pigment from an aqueous pulp into an organic medium in the following proportions:

| | |
|---|---|
| Pigment | 0.25 |
| 10% ethyl cellulose soln. (same as in Ex. 1) | .20 |
| Alkyd resin soln. (same as in Ex. 1) | .06 |
| Turpentine | 1.06 | and to this concentrate was added,

| | |
|---|---|
| Tripropylene phosphoramide | 0.10 |
| Hycar 1872 (a latex) | 5.00 | and a clear extender emulsion containing,

| | |
|---|---|
| Aerotex M-3 (80% dimethyl trimethylol melamine and 20% water) | 2.00 |
| Alkyd resin solution (same as in Ex. 1) | .90 |
| Octyl alcohol | 1.30 |
| 22% solution of polyacrylic acid in water | 2.55 |
| NH$_4$OH (28%) | .65 |
| Di-ammonium phosphate | .01 |
| Varsol No. 2 | 23.50 |
| Water | 60.42 |
| Ethyl cellulose, 10 cp. grade, T-type | 0.50 |
| Solvesso 100 | .70 |
| Tripropylene phosphoramide | .80 |

This print paste produces a light shade yellow print without tarnishing when printed on cotton or nylon from an engraved copper cylinder. The prints have excellent crock and wash resistance.

EXAMPLE 4

A white pigmented water-in-oil emulsion is prepared by first dispersing,

| | |
|---|---|
| Titanium dioxide (rutile) | 15.0 | into a vehicle consisting of

| | |
|---|---|
| Alkyd resin soln. (same as in Ex. 1 concentrate) | 0.9 |
| Ethyl cellulose soln. (same as in Ex. 1 concentrate) | 3.0 |
| Turpentine | 4.6 |
| Tripropylene phosphoramide | 1.5 | and then diluting this concentrate with

| | |
|---|---|
| 40% latex of copolymer of 45 parts acrylonitrile 55 parts butadiene copolymerized with 3 to 5 parts methacrylic acid | 15.0 |
| Clear water-in-oil extender (same as Ex. 1) | 57.5 |
| Auxiliary cross-linker composition | 2.5 |

The auxiliary cross-linker composition consisted of 20% of 10 cp. ethyl cellulose, T-type, 20% 2-ethyl hexanol, 28% Solvesso 100 and 32% tripropylene phosphoramide. The resulting print paste prints well from an engraved cylinder without tarnishing and gives prints having excellent fastness properties. The paste contains a total of 2.3% cross-linker and 6% of cross-linkable linear polymer containing carboxyl groups.

EXAMPLE 5

A black textile printing paste containing 0.25% carbon black is prepared as follows:

| | |
|---|---|
| Carbon black (Elftex 3) | 0.25 | is dispersed on a 3-roll ink mill into

| | |
|---|---|
| Alkyd resin solution (same as in Ex. 1) | .12 |
| Turpentine | 1.01 |
| Tripropylene phosphoramide | .09 | and then this concentrate dispersion is diluted with

| | |
|---|---|
| Water-in-oil emulsion extender | 96.03 |
| Cross-linker auxiliary (same as in Ex 4) | 2.50 |

The 96.03 parts of extender emulsion consisted of 0.95 part alkyd resin (same as Example 1), 0.85 part 2-ethylhexanol, 2.75 parts 22% aqueous solution of polyacrylic acid, 0.72 part ammonium hydroxide (28%), 0.01 part of di-ammonium phosphate, 25.40 parts Varsol #2 and 65.35 parts water. In this print paste which would be called a "long cut" in the trade, it was necessary to add the auxiliary cross-linker in order to obtain good binding of the pigment to fabric. This is generally true in "long cuts."

When additional stability is desired we have found a stabilizer for the tripropylene phosphoramide can be included in the formulation. Tertiary amines, especially N-alkyl morpholines, are effective stabilizers. Example 6 illustrates the use of N-ethyl morpholine as a stabilizer and also illustrates the use of a discharge agent in the print paste.

EXAMPLE 6

A storage stable color concentrate is prepared by flushing 20 parts of phthalocyanine green from aqueous pulp into 80 parts of a water-immiscible organic solvent solution of a cross-linking agent, alkyd resin, and ethyl cellulose using suitable dispersing equipment such as a dough-mixer of three-roll mill. The composition of the color concentrate was:

| | |
|---|---|
| Phthalocyanine green | 20.00 |
| Solvesso 100 | 51.08 |
| Tripropylene phosphoramide | 8.00 |
| Ethyl morpholine (stabilizer for cross-linker) | .16 |
| Alkyd resin soln. (same as in Example 1) | 4.76 |
| Ethyl cellulose solution (same as in Example 1) | 16.00 |
| | 100.00 |

A clear extender water-in-oil emulsion of printing consistency was prepared by dispersing water-immiscible volatile solvent and 35% aqueous solution of sodium sulfoxylate formaldehyde in a previously prepared concentrate emulsion consisting of alkyd resin in xylol and polyacrylic acid in water and triethyl amine. The complete composition of this clear extender emulsion was:

| | |
|---|---|
| Alkyd resin soln. (same as in color concentrate) | 2.7 |
| 2-ethyl hexanol | .8 |
| Polyacrylic acid solution in water, 22% | 3.9 |
| Triethyl amine | 1.1 |
| Varsol #2 | 21.5 |
| 35% aqueous solution of sodium sulfoxylate formaldehyde | 70.00 |
| | 100.00 |

To make discharge print pastes the color concentrate and clear extender are mixed in the desired ratio with additional cross-linkable copolymer, which is also an anti-crocking agent, and with additional alkyd resin solution to stabilize the emulsions. The preparation of three typical "cuts" is illustrated.

| | 4% Pigment | 2% Pigment | 0.25% Pigment [1] |
|---|---|---|---|
| Color concentrate | 20.00 | 10.0 | 12.5 |
| 40% latex (45 parts acrylonitrile 55 parts butadiene and 1-3 parts of methacrylic acid) | 15.00 | 10.0 | 3.7 |
| Alkyd resin solution (same as in Example 1) | 2.5 | 2.5 | 2.5 |
| Clear extender | 62.5 | 77.5 | 81.3 |

[1] In this paste containing 0.25% pigment the 2% pigment paste was used as the source of pigment.

Each of these discharge pastes, when printed on a previously dyed cotton fabric that has been dyed with a dischargeable azo dye, will discharge the dye and leave a washfast and crock resistant green print in the areas where the fabric is printed. The 4% produces a deep shade of green, the 2% paste produces a medium green shade and the 0.25% paste produces a light shade of green.

These discharge printing pastes also illustrate the use of water-dispersion, i.e. latex, of cross-linkable linear polymer which is also a low-crock agent. The amount of such material used is dependent upon the amount of pigment present but, as the three pastes illustrate, the ratio of this low-crock agent to pigment is higher at low pigment content than it is at the higher pigment content. Adequate crockfastness is usually obtained when the ratio of low-crock additive to pigment is within the limits of ½ to 5 parts to each part of pigment on solids basis.

EXAMPLE 7

A color concentrate that is stable on storage was prepared by flushing 15 parts of an Indomaroon pigment (5,5' - dichloro - 7,7' - dimethyl - 2,2' - bisthionaphthene-indigo) from its press cake into 75.9 parts of a 15% solution of natural rubber in xylol (a conventional flushing aid), 0.5 part of ethyl cellulose (50 cp. grade, T-type) and then 5.0 parts of tripropylene phosphoramide was added to the dispersion.

A clear water-in-oil emulsion extender was prepared by emulsifying 70 parts of water into 1 part of 50 cp. grade of ethyl cellulose (T-type) in 7.3 parts of xylol and 21.7 parts of Varsol #2.

A print paste containing 3.27% of the Indomaroon pigment was prepared by mixing,

| | |
|---|---:|
| Color concentrate | 26.7 |
| Clear extender | 86.0 |
| Latex (38% dispersion of copolymer consisting of 63 parts butyl acrylate, 31 parts acrylonitrile, 5 parts N-tertiary butyl acrylamide and 1 part methacrylic acid) | 10.0 |

This print paste produces medium shade maroon prints on cotton and nylon fabrics having excellent washfastness and good crockfastness properties. Improved crocking properties can be obtained by increasing the ratio of acrylic copolymer latex to pigment. The print pastes does not exhibit tarnishing when printed from an intaglio printing cylinder employing conventional doctoring.

EXAMPLE 8

A blue color concentrate was prepared by flushing 22.7 parts of copper phthalocyanine blue pigment from its 20% aqueous pulp into 55.2 parts turpentine, 3.9 parts of alkyd resin (same as in Example 1), and 18.2 parts of a solution of ethyl cellulose (same as in Example 1).

A print paste containing 4% pigment was prepared by mixing 17.6 parts of the above color concentrate with 65.3 parts of an unpigmented water-in-oil extender emulsion, 2.1 parts of the cross-linking agent made by reacting three moles of 2,2-dimethyl ethylene imine with one mole of phosphorus oxychloride, and 15 parts of a 38% cross-linkable acrylic copolymer dispersion in water (copolymer of 35 parts acrylonitrile and 65 parts butadiene, copolymerized with 3 to 5 parts of methacrylic acid).

The clear unpigmented extender emulsion was prepared by emulsifying an aqueous phase consisting of 2 parts of ammonium polyacrylate in 75 parts of water into an organic phase consisting of 21.4 parts Varsol #2 and 1.6 parts of the alkyd resin of Example 1.

EXAMPLE 9

A blue print paste containing 1.88% blue pigment was prepared using the color concentrate, cross-linking agent, cross-linkable copolymer and unpigmented extender emulsion of Example 8 in the following proportions:

| | |
|---|---:|
| Color concentrate of Example 8 | 8.3 |
| Cross-linking agent of Example 8 | 1.4 |
| Cross-linkable acrylic copolymer dispersion of Example 8 | 10.0 |
| Extender emulsion of Example 8 | 80.3 |

EXAMPLE 10

A blue print paste was made as in Example 8 except that the cross-linker used was the compound obtained by reacting three moles of 2,2,3-trimethyl ethylene imine with one mole of phosphorus oxychloride.

EXAMPLE 11

A blue print paste was prepared as in Example 9 except that the crosslinking agent used was the compound obtained by reacting three moles of 2,2,3-trimethyl ethylene imine with phosphorus oxychloride.

EXAMPLE 12

A blue print paste was prepared as in Example 8 except that the cross-linking agent was the compound obtained by reacting three moles of 2-ethyl ethyleneimine with phosphorus oxychloride.

EXAMPLE 13

A blue print paste was prepared as in Example 9 except that the cross-linking agent was the compound obtained by reacting three moles of 2-ethyl ethylene imine with phosphorus oxychloride.

EXAMPLE 14

A blue print paste was prepared as in Example 8 except that the cross-linking agent was the compound obtained by reacting three moles of 2,3-dimethyl ethylene imine with one mole of phosphorus oxychloride.

EXAMPLE 15

A blue print paste was prepared as in Example 9 except that the cross-linker was the compound obtained by reacting three moles of 2,3-dimethyl ethyleneimine with one mole of phosphorus oxychloride.

In each of the examples from 8 through 15 the print pastes printed well from engraved cylinders without tarnishing and gave prints of excellent color value and fastness properties. The examples of even number gave dark blue prints while the odd examples gave medium dark-blue prints.

Only one alkyd resin has been exemplified in the examples as the emulsifying alkyd. This is a member of a preferred class of alkyd resins. Their preparation is more fully described in application Serial No. 505,026, now Patent No. 2,848,431, filed May 12, 1955 by Russell T. Dean, and Joseph P. Manasia, and it is intended that all members of this class be included as operable in the present invention, especially those prepared from (A) phthalic anhydride, (B) fatty oil acid, (C) acid catalyzed phenoxyethanol-formaldehyde condensate having a melting point on the order of 75° C., and (D) a polymeric polyhydric alcohol having alternating aliphatic chains and aromatic nuclei united through ether oxygen and having 5 to 20 alcoholic hydroxyl groups per molecule, wherein the reactants used in preparing the resin are within the limits:

(1) 1 to 1.5 equivalents of B for each equivalent of (A)
(2) the amount by weight of D is 0.25 to 2 times the amount of C and,
(3) the total amount by weight of C plus D is 1 to 1.5 times the total amount of A plus B, and wherein the alkyd resin has a viscosity of at least 30 poises as determined on a 50% xylene solution of the resin at 25° C. Although these particular resins are preferred it is intended that the claims cover the use of other less preferred emulsifying alkyd resins. Typical of such resins are the medium to long fatty oil or fatty acid modified alkyd resins which are conventional in the prior art, e.g. U.S. patents Re. 23,134, 2,202,283, 2,222,581, 2,222,582, 2,267,620, 2,364,692, 2,376,319, 2,504,136, 2,533,270, 2,558,053, 2,600,890 and 2,691,005.

The use of ethyl cellulose as a water-in-oil emulsifier is well known in the art. For purposes of the present invention we may use any of the organic solvent soluble grades of ethyl cellulose. These usually have 44 to 50% ethoxy and we prefer to use the 5 to 100 cps. grades.

Diammonium phosphate, when used in the examples, is used as an emulsion stabilizer in conventional manner. Other salts can, of course, be used for this purpose.

and amide groups having hydrogen attached to nitrogen, said cross-linking agent being a trialkylene phosphoramide of the formula:

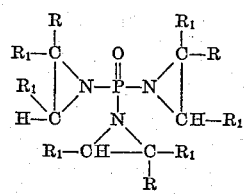

*Table I*

SUMMARY OF PERCENT COMPOSITION OF THE PRINT PASTES OF EXAMPLES 1 TO 9

| Example No. | 1 | 2 | 3 | 4 | 5 | 6 | 6 | 6 | 7 | 8 | 9 |
|---|---|---|---|---|---|---|---|---|---|---|---|
| Pigment | 4.00 | 2.00 | 0.25 | 15.0 | .25 | 4.00 | 2.0 | .25 | 3.27 | 4.00 | 1.88 |
| Cross-linker | 1.60 | 1.60 | .90 | 2.3 | .89 | 1.60 | 0.8 | .10 | 1.09 | 2.10 | 1.40 |
| Dispersed copolymer | 6.00 | 4.00 | 2.00 | 6.0 | | 6.00 | 4.0 | 1.98 | 3.10 | 5.7 | 3.80 |
| NH₄ polyacrylate or polyacrylic acid | | .46 | .56 | | 0.62 | .54 | .66 | .78 | | 1.30 | 1.61 |
| Ethyl cellulose | .32 | 1.19 | .52 | 0.80 | .50 | .32 | .16 | .02 | .81 | 0.32 | 0.15 |
| Alkyd resin | 1.06 | .24 | .48 | 1.02 | 1.01 | 2.57 | 2.54 | 2.67 | | 0.86 | 0.80 |
| Turpentine | 19.30 | 10.69 | 1.21 | 6.85 | 1.01 | 2.40 | 1.20 | .15 | | 12.12 | 5.72 |
| Pine oil | 0.15 | | | .14 | | | | | | | |
| Xylol | 0.93 | .24 | .45 | .99 | .06 | 2.57 | 2.54 | 1.42 | 22.27 | 0.86 | 0.80 |
| Varsol #2 | 16.34 | 18.90 | 23.50 | 16.10 | 25.40 | 13.44 | 16.66 | 19.24 | 15.20 | 13.98 | 17.21 |
| Octyl alcohol | .48 | 1.27 | 1.33 | 0.95 | 1.35 | 0.98 | .86 | .76 | | .48 | .23 |
| Water | 50.82 | 58.07 | 65.41 | 49.15 | 67.48 | 41.33 | 46.14 | 51.51 | 54.13 | 58.28 | 66.40 |
| Solvesso 100 | | .70 | .70 | .70 | .70 | 10.22 | 5.11 | .64 | | | |
| (NH₄)₂HPO₄ | | .09 | .01 | | .01 | | | | | | |
| 28% NH₃ | | .55 | .65 | | .72 | | | | | | |
| Aerotex M-3 | | | 2.00 | | | | | | | | |
| Ethyl morpholine | | | | | | .03 | .02 | Trace | | | |
| Triethylamine | | | | | | .69 | .85 | 1.01 | | | |
| Sulfoxylate | | | | | | 15.31 | 17.46 | 20.47 | | | |
| Natural rubber | | | | | | | | | 0.12 | | |

The percent compositions of the Examples 1 to 9 is summarized in Table I. Examples 10, 12, and 14 would be similar to Example 8 while Examples 11, 13, and 15 would be similar to Example 9.

In general, the print pastes made in accordance with the invention will contain no more than about 15% by weight of film-forming material (i.e. cross-linker, cross-linkable copolymer, ethyl cellulose, alkyd resin, melamine-formaldehyde resin, etc.). Print pastes containing film-forming solids in excess of about 15% are very difficult to formulate as a practical matter and in addition they tend to give finished printed fabrics having undesirable stiffness or hand. The lower limit as to amount of binder in the print paste is not particularly critical and in general the amount of binding action is directly proportional to the total amount of binder present. In general the binding action is negligible at ratios of less than 0.25 binder to 1.0 pigment.

The ratio of cross-linking agent to cross-linkable polymer will depend on the particular cross-linkable polymer used. For example, when the dispersed copolymer containing 3 to 5% copolymerized acrylic or methacrylic acid is used the amount of copolymer should be two to four times the amount of cross-linker. When polyacrylic acid or ammonium polyacrylic is the cross-linkable polymer the ratio should preferably be 1 to 1.5 parts cross-linker for each part of the polymer. Higher ratios of cross-linker can be used but they do not contribute any significant advantages. It is believed that the above ratios are the most desirable because they furnish sufficient cross-linker to react with all of the reactive hydrogens of the polymer.

We claim:

1. A pigmented composition useful in the preparation of water-in-oil emulsion textile printing pastes which comprises a substantially non-aqueous storage stable concentrate composition containing a pigment, volatile water-immiscible organic solvent, water-in-oil emulsifying agent of the group consisting of ethyl cellulose and fatty acid modified alkyd resin, and a cross-linking agent capable of reacting in the presence of water with a member of the group consisting of carboxylic acid groups where R is a lower alkyl group and R₁ is a member of the group consisting of hydrogen and lower alkyl group.

2. A composition as in claim 1 wherein the cross-linking agent is tripropylene phosphoramide.

3. A composition as in claim 1 wherein the water-in-oil emulsifying agent is ethyl cellulose.

4. A composition as claimed in claim 1 wherein the water-in-oil emulsifier is a fatty acid modified alkyd resin.

5. A composition as in claim 1 wherein the water-in-oil emulsifying agent is an alkyd resin prepared from (A) phthalic anhydride (B) fatty oil acid, (C) acid catalyzed phenoxyethanol formaldehyde condensate having a melting point on the order of 75° C., and (D) a polymeric polyhydric alcohol having alternating aliphatic chains and aromatic nuclei united through ether oxygen and having 5 to 20 alcoholic hydroxyl group per molecule, wherein the reactants used in preparing the resin are within the limits:

(1) 1 to 1.5 equivalents of B for each equivalent of A,
(2) the amounts, by weight, of D is 0.25 to 2 times the amount of C and,
(3) the total amount by weight of C plus D is 1 to 1.5 times the total amount of A plus B, and wherein the alkyd resin has a viscosity of at least 30 poises as determined on a 50% xylene solution of the resin at 25° C.

6. A textile printing composition consisting of an aqueous phase emulsified into a water-immiscible organic phase by means of a water-in-oil emulsifying agent of the group consisting of ethyl cellulose and fatty acid modified alkyd resin wherein the aqueous phase contains a substantially linear, high polymeric material containing reactive hydrogens selected from the group consisting of the reactive hydrogens in acrylic acid, methacrylic acid, acrylamide, and methacrylamide and wherein the water-immiscible organic phase comprises pigment, volatile water-immiscible organic solvent and a trifunctional monomeric cross-linking agent for the polymer containing reactive hydrogens, said cross-linking agent having the formula:

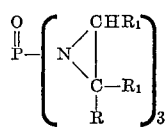

wherein R is a lower alkyl group and $R_1$ is a member of th group consisting of hydrogen and lower alkyl group.

7. A textile printing composition as in claim 6 wherein the cross-linking agent is tripropylene phosphoramide.

8. A textile printing composition as in claim 6 wherein the aqueous phase contains a discharge agent.

References Cited in the file of this patent

UNITED STATES PATENTS

| | | |
|---|---|---|
| 2,582,181 | Truhlar et al. | Jan. 8, 1952 |
| 2,663,696 | Armatys | Dec. 22, 1953 |
| 2,691,005 | Booth | Oct. 5, 1954 |
| 2,848,431 | Dean | Aug. 19, 1958 |
| 2,933,416 | Haakh et al. | Apr. 19, 1960 |

FOREIGN PATENTS

| | | |
|---|---|---|
| 491,995 | Canada | Apr. 14, 1953 |

OTHER REFERENCES

Angewandte Chemie, volume 67, pages 226–230, 1955, No. 8.